United States Patent

[11] 3,588,426

| [72] | Inventors | Robert R. Harriau<br>Old Greenwich, Conn.;<br>Wallace C. Rudd, Larchmont, N.Y. |
|---|---|---|
| [21] | Appl. No. | 837,207 |
| [22] | Filed | June 27, 1969 |
| [45] | Patented | June 28, 1971 |
| [73] | Assignee | AMF Incorporated<br>New York, N.Y. |

[54] METHOD AND APPARATUS FOR HI-FREQUENCY WELDING EDGES ADVANCED IN PARALLEL
27 Claims, 21 Drawing Figs.

[52] U.S. Cl. .................................................. 219/67,
219/59, 219/64, 219/101, 219/105, 219/107
[51] Int. Cl. ...................................................... B23k 31/06
[50] Field of Search .......................................... 219/59, 64,
67, 101, 102, 103, 104, 105, 107; 228/44

[56] References Cited
UNITED STATES PATENTS
2,066,668 1/1937 Bennett ........................ 219/67

| 2,821,619 | 1/1958 | Rudd .......................... | 219/107 |
| 2,919,342 | 12/1959 | Kohler et al. ................ | 219/67X |
| 3,131,285 | 4/1964 | Kohler et al. ................ | 219/67 |
| 3,265,277 | 8/1966 | Bacroix ....................... | 219/102X |
| 3,385,948 | 5/1968 | Redmond ..................... | 219/102X |
| 3,482,073 | 12/1969 | Roberts ........................ | 219/64X |

*Primary Examiner*—J. V. Truhe
*Assistant Examiner*—L. A. Schutzman
*Attorneys*—George W. Price and John W. Gallagher ABSTRACT: The edge of a first metal portion is welded to a surface of a second metal portion by forming at least said edge with a bulging cross-sectional shape providing a protruding volume of metal at said edge, and while advancing said edge, and said surface toward a weld point along spaced paths lying in substantially parallel planes, by heating them by high frequency electric current so that the surface and the edge are at welding temperature and at least a portion of the protruding metal is at extrusion temperature by the time the weld point is reached, at which point at least a portion of protruding metal is forced into the space between the surface and the edge to form a weld therebetween.

INVENTORS
ROBERT R. HARRIAU
WALLACE C. RUDD
BY Ward, McElhannon,
Brooks & Fitzpatrick
ATTORNEYS

INVENTORS
ROBERT R. HARRIAU
WALLACE C. RUDD
BY Ward, McElhannon,
Brooks, & Fitzpatrick
ATTORNEYS

METHOD AND APPARATUS FOR HI-FREQUENCY WELDING EDGES ADVANCED IN PARALLEL

This invention relates to the welding together of an edge of a first metal portion to the surface of another metal portion while such portions are being continuously advanced and subjected to heating by high frequency current flowing therealong in advance of a weld point where said edge and said surfaces are welded together.

High frequency welding of the type to which the invention applies is disclosed in U.S. Pat. Nos. 2,818,488 and 3,037,105, as well as in other patents. In general, in such prior art welding, the opposite edges of a single sheet or strip of metal shaped to form an almost complete tube, or an edge of a first sheet or strip and a surface of another metal member, are advanced along closely spaced paths which intersect at a weld point where the edges, or the edge and the surface of the other member, which are then at welding temperature and in abutting relation, are forced together to form a weld, preferably a forge weld therebetween. High frequency heating current, often in the range from 10,000 Hz. to 500,000 Hz. and providing the advantages now well known in the art, is caused to flow along the edges, or along the edge and the surface of the other member, from points in advance of the weld point to and from the weld point. The current may be supplied to the surfaces to be welded together by contacts ahead of the weld point and engaging the members to be welded together or by an induction coil which, at least in part, encircles the members or is in close proximity to the surfaces to be welded together, in advance of the weld point. Because the surfaces are brought together in abutting relation, such welding is known as butt welding.

In such prior art welding, the surfaces to be welded together follow paths which intersect at the weld point; i.e., they do not follow substantially parallel paths, so that the surfaces in advance of the weld point form the sides of a V with its apex at the weld point. The V-gap has been considered to be necessary because in order to have the current flow along the surfaces in advance of the weld point, the surfaces must be spaced apart in advance of the weld point but in order to weld the surfaces together they must be brought into contact under substantial pressure at the weld point. This necessarily results in causing the surfaces to follow nonparallel paths and bending of the members in advance of the weld point.

It has been found to be desirable to forge weld the members together at the weld point which requires the application of substantial pressures, of the order of several thousands of pounds, to accomplish the desired forge weld. It is, of course, difficult to apply such pressure at the weld point particularly, as in the case of relatively wide sheets, for example, if the pressure cannot be applied to the members close to the surfaces to be welded together. In addition, if the members are difficult to bend, for example, if they are relatively thick or tubular or if they are made of a stiff or brittle metal, substantial problems are encountered in trying to cause the surfaces to follow nonparallel, intersecting paths in advance of the weld point, and in some cases, it has not been able to use the prior art methods for welding such members.

In U.S. Pat. Ser. No. 3,482,073, entitled "Methods and Apparatus for Welding Seams," methods and apparatus for simplifying the application of the forge welding pressure to the members at the weld point are disclosed. In such methods, the edges to be joined together are formed so as to have a bulging cross-sectional shape which provides surfaces which may be engaged by pressure applying rollers for the purpose of pressing the edge surfaces together. However, while this method overcomes one of the foregoing problems, it is still necessary to advance the surfaces to be welded together along nonparallel intersecting paths which intersect at the weld point, and the bulging formations are kept firm enough to permit the application of pressure sufficient to bring the edges together and force weld them at the weld point. U.S. Pat. No. 3,287,536, relating to the forming of spiral pipe, also suggests forming the edges with flanges to prevent contact therebetween and to provide a wide separation therebetween in advance of the weld point, but in the method of this patent also, the edge surfaces to be joined are advanced along nonparallel paths which intersect at or near the weld point and the portions to be joined must be bent so that the problems mentioned above still exist.

Another disadvantage of advancing the surfaces to be welded together along paths which intersect at the weld point is that it is difficult to maintain precise control of the point at which the surfaces come together and to maintain a fixed V-gap between the surfaces in advance of the weld point. This is not only because of mechanical problems but also because molten or softened metal may be present near the weld point and because the metal in advance of the weld point tends to change its shape because of thermal expansion. If the point at which the surfaces are brought into contact wanders longitudinally of the weld seam, the heating of the surfaces varies because the time of heating varies, and this is particularly critical at the weld point because the current concentration is the highest at this point. If the spacing between the surfaces in advance of the weld point varies, the heating of the surfaces also similarly varies because the concentration of the current at the surfaces is largely determined by the so-called proximity effect, the relative positions of the surfaces changing the relative concentration of the current across the surfaces and a wider spacing between the surfaces decreasing the current concentration and vice versa.

A further disadvantage of advancing the surfaces along nonparallel paths is that the spacing between the surfaces at the point or points of application of the heating current in advance of the weld point cannot be the minimum necessary to prevent voltage breakdown between the surfaces since the spacing decreases in the direction of the weld point. It is desirable to maintain the spacing at a minimum not only because maximum advantage is taken of the proximity effect with the accompanying current concentration at the surfaces but also because the inductance of the current path is reduced permitting greater loading of the current generator even if contacts relatively widely spaced from the weld point are used to supply the current to the surfaces.

Other disadvantages of advancing the surfaces along nonparallel intersecting paths in advance of the weld point are arcing which may occur between the surfaces when they come close together near the weld point due to voltage breakdown across the gap and arcing across the gap at various points therealong due to irregularities at the surfaces or metal particles or burrs which may be present at the edges.

In accordance with the invention, the foregoing problems are substantially eliminated by advancing the portions to be welded together along spaced paths lying in closely spaced, substantially parallel planes both before and after the weld point and by upsetting at least one of the portions in a manner which will provide metal which can be forced into the space between the portions at the weld point to form a weld therebetween. The portions are heated in advance of the weld point by high frequency current, and by properly selecting the magnitude and frequency of the current, the distance between the point or points of application of the current and the weld point, the speed at which the portions are advanced and the relative positions and spacing thereof, the surfaces to be joined can be heated to the desired welding temperature and the upset metal can be heated to the temperature necessary to permit pressing of such metal into the space between the portions by the time they reach the weld point.

The methods of the invention have several advantages. Since the portions follow substantially parallel paths, it is unnecessary to bend them, and the spacing therebetween from the point of application of the current substantially to the weld point may be not substantially greater than that required to prevent arcing therebetween thereby providing better and more uniform current concentration at the surfaces to be joined and permitting proper generator loading even if the point of application of the current is relatively widely spaced from the weld point in order to heat the larger mass of metal used in making the weld. Since pressure is applied only to heated metal adjacent the surfaces to be joined, it is unnecessary to apply welding pressure elsewhere on the portions with the accompanying problems. Since in advance of the weld point the surfaces are not under bending forces which tend to twist them and have a substantially constant spacing, the relative positions thereof may be controlled readily and the prior art arcing problems may be eliminated or substantially reduced. Also, because the gap between the surfaces is closed rapidly by the upset metal and over a comparatively short distance, the point at which the surfaces come together may be maintained relatively precisely.

In the process of the invention, the heating of the portions to be joined differs from that used in the prior art processes employing a V-gap. In such prior art processes, it is desirable to keep the depth of heating at the surfaces to be joined to a minimum not only for maximum efficiency but also to keep the metal adjacent such surfaces as firm as possible to avoid distortion of the seam, excess weld metal and problems in applying welding pressure. Therefore, relatively high frequency currents, having a small "skin depth," high speeds of advance and application of the current close to the weld point are used.

In contrast, in the process of the invention, the various factors are selected so as to not only bring the surfaces to be welded together to welding temperature at the weld point but also to heat additional metal including the upset metal to a temperature which will permit it to flow with reasonable pressure applied thereto without cracking or other undesirable effects. Such temperature of the additional metal, which we shall call the extrusion temperature, is one which permits a volume of the metal sufficient to substantially fill the space between the portions at the weld point, using pressures of the order of forge welding pressures, to flow from the upset position thereof and still produce a satisfactory weld seam. For ordinary steel, for example, the temperature of the metal to be displaced preferably is at least 500° F.—700° F. but is less than the melting temperature thereof and preferably less than the temperature of the surfaces nearest each other which may, for example, have a temperature in the range from 2100° F. to 2800° F.

Although the invention has special utility in the welding together of members which cannot be bent readily, such as tubes, wide sheets, and relatively thick strip, it has a wide variety of uses and may be used with advantage for welding the various shapes, materials and structures for which the prior art methods have been and are used, including, for example, tubing and pipe, both cylindrical and tapered, T, I and L-shaped members, double width sheets or strip, etc.

Other objects and advantages of the invention will be apparent from the following detailed description of preferred embodiments thereof which description should be considered in connection with the accompanying drawings in which.

Figure 1:
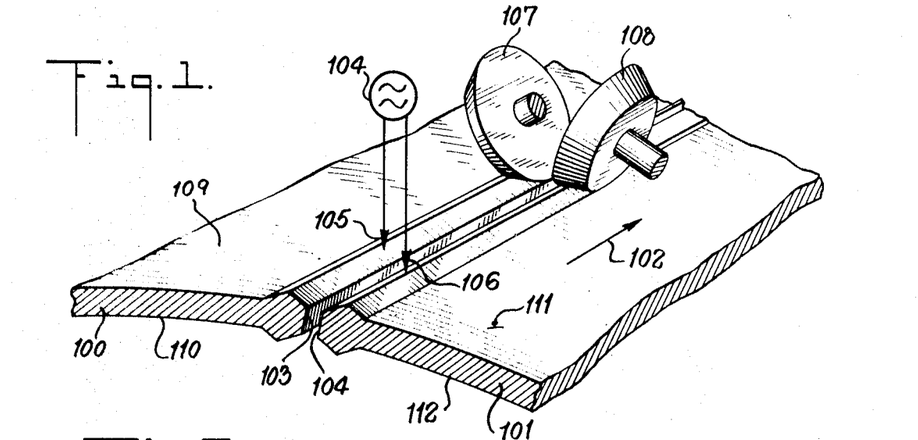
FIG. 1 is a schematic, fragmentary, perspective view illustrating the welding together of a pair of edges of either a single metal strip or a pair of metal strips.

FIG. 1 illustrates the application of the invention to the welding together of a pair of metal portions 100 and 101 which may be the opposite edge portions of a single strip of metal formed substantially into a tube or may be the edge portions of a pair of separate metal strips. The metal portions 100 and 101 are advanced in the direction of the arrow 102 by any conventional means (not shown) with their edge surfaces 103 and 104 substantially parallel and along closely spaced paths lying in substantially parallel planes. Although the spacing between the edge surfaces 103 and 104 may be larger, preferably it is not substantially greater than that required to prevent voltage breakdown therebetween when heating current is supplied thereto from the high frequency source 104 by means of the contacts 105 and 106 which engage the portions 100 and 101 adjacent their edges and in advance of the weld point which underlies the pressure rollers 107 and 108.

Contrary to the prior art practice described above, it is unnecessary to bend the portions 100 and 101 in a direction parallel to their major surfaces 109—112 or to apply welding pressure thereto in such direction to bring them together at the weld point and thereby divert them from substantially parallel paths. Instead, the portions 100 and 101 are merely held, as they are advanced, so that the surfaces 103 and 104 follow substantially parallel paths in advance of the weld point and hence, so that the portions 100 and 101 follow substantially parallel paths both before and after the weld point. Of course, the portions 100 and 101 may be held by conventional means (not shown) which will prevent them from spreading apart at the weld point as the rollers 107 and 108 press the heated metal to form a weld as described hereinafter.

Figure 2:
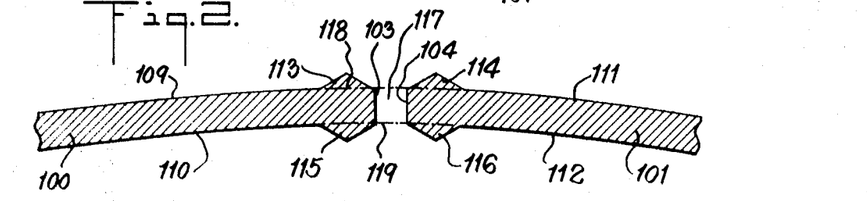
FIG. 2 is a cross-sectional, end elevation view of a portion of the embodiment shown in FIG. 1.

The edges of the metal portions 100 and 101 are upset so as to have a bulging cross-sectional shape as illustrated in FIGS. 1 and 2, and preferably, the edges are upset so as to provide metal at the edges protruding above and below the upper and lower surfaces 109—112 of the metal portions 100 and 101. In the preferred form of the invention, the edge portions are formed so as to have the hexagonal shape illustrated in FIGS. 1 and 2 which provides a metal 113 and 114 protruding, respectively, above the upper surfaces 109 and 111 and metal 115 and 116 protruding below the lower surfaces 110 and 112. Preferably, also, the vertical dimension or height of the edge surfaces 103 and 104 is substantially equal to the thickness of the metal portions 100 and 101.

The volume of the metal in the protruding portions 113—116 is selected relative to the spacing between the surfaces 103 and 104 and the thickness of the portions 100 and 101 so as to be at least substantially equal to the volume of the space 117 which is immediately in advance of the weld point and between the edge surfaces 103 and 104 and extensions of the upper and lower surfaces of the metal portions 100 and 101 indicated by dot-dash lines 118 and 119 in FIG. 2. Preferably the volume of the metal in the protrusions 113—116 is greater than the volume of such space 117.

Figure 3:
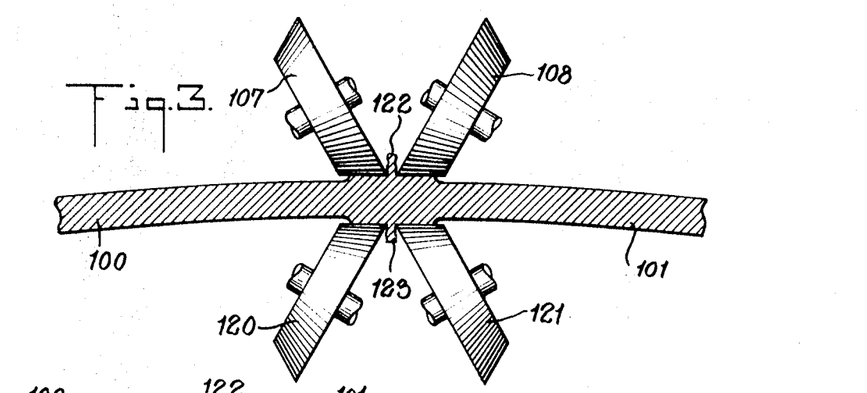
FIG. 3 is a cross-sectional, end elevation view of the embodiment shown in FIG. 1 and illustrates the appearance of the weld at the weld point.

FIG. 3 illustrates the appearance of the weld at the weld point. As the edge surfaces 103 and 104, and hence the metal portion 100 and 101 are advanced along substantially parallel paths toward the weld point, the edge surfaces 103 and 104 as well as metal spaced therefrom including at least part of the protruding metal 113—116 are heated by the high frequency current which flows from the contacts 105 and 106 to and from the weld point. If the speed at which the metal portions 100 and 101 are advanced, the spacing of the contacts 105 and 106 from the weld point, and the frequency and magnitude of the heating current are properly selected, the edge surfaces 103 and 104 will be at welding temperature and at least part of the protruding metal 113—116 will be soft enough by the time the surfaces and the protruding metal portions reach the weld point to permit the rollers 107 and 108 and the rollers 120 and 121, each of which has a frustoconical shape, to compress the protruding metal 113—116 and cause both such protruding metal and the edge surfaces 103 and 104 to move sidewise and fill the space 117. Also, such rollers 107—108 and 120—121 will preferably force the edge surfaces 103 and 104 against each other with forge welding pressure, thereby producing a forge weld at the weld point between the metal portions 100 and 101.

Figure 7:
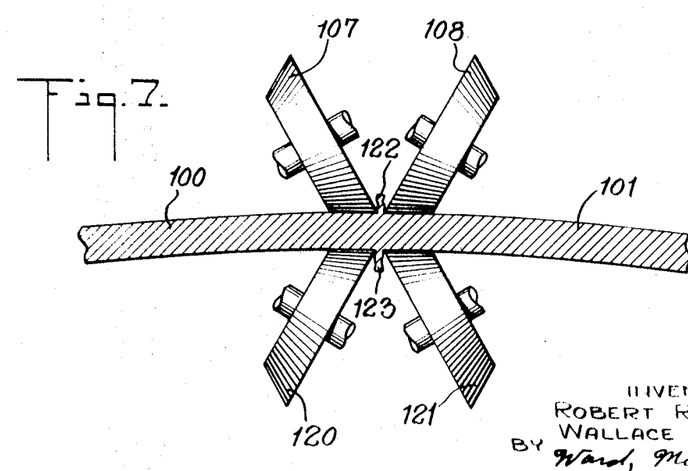
FIG. 7 is a cross-sectional, end elevation view similar to FIG. 3 and illustrates an alternative form of weld.

The axes of the rollers 107, 108, 120 and 121 extend at an angle to the upper and lower surfaces of the metal portions 100 and 101 so that the lowermost portions of the faces thereof in engagement with the heated metal are substantially parallel to the upper and lower surfaces of the metal portions 100 and 101, although such portions of the faces may extend at a slight angle to such upper and lower surfaces if desired. If the volume of the protruding metal 113—116 is greater than the space 117, then the spacing between the rollers 107 and 120 and the rollers 108 and 121 may be greater than the thickness of the metal portions 100 and 101 so as to provide an increased thickness at the weld seam as illustrated in FIG. 3. However, if desired, the spacing therebetween may be substantially equal to the thickness of the metal portions 100 and 101 so as to provide a flush weld seam as illustrated in FIG. 7.

If desired, the separation between the rollers 107 and 108 and the separation between the roller 120 and 121 may be such that the edges thereof substantially touch at the weld point but preferably, they are spaced apart so as to permit metal, such as the metal 122 and 123 to be extruded and flow therebetween as the weld is formed. Said extruded metal 122 and 123 may thereafter be scarfed away in a manner well known in the art.

It will be apparent from the shape and positioning of the rollers 107, 108, 120 and 121 that as they engage the protruding metal 113—116 they press it in opposite directions thereby causing the protruding metal to displace metal therebelow toward the space between the surfaces 103 and 104, the metal farther away from the surfaces 103 and 104 being at a lower temperature and hence harder. When the surfaces 103 and 104 contact each other, the rollers 107, 108, 120 and 121 continue to apply pressure to the protruding metal and force the surfaces 103 and 104 together to form a weld therebetween and any excess metal is squeezed out as extruded metal 122 and 123. It will be apparent to those skilled in the art that rollers of other shapes may be employed to similarly apply pressure to the protruding metal to produce the desired weld.

Figure 4:
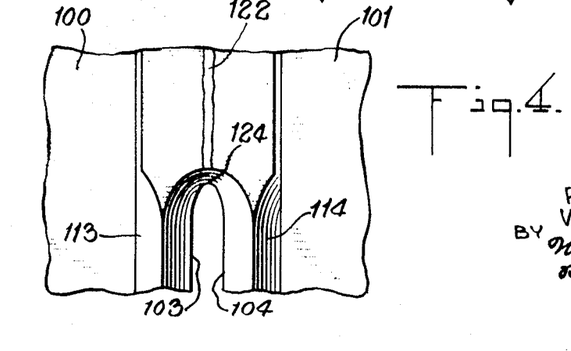
FIG. 4 is a fragmentary, plan view of a portion of the embodiment shown in FIG. 1.

FIG. 4 illustrates the appearance of one side of the weld with the rollers 107 and 108 removed. As illustrated in FIG. 4, the edge surfaces 103 and 104 are brought together approximately at the point designated by the numeral 124 and the protruding metal 113 and 114 is flattened by the rollers 107 and 108. A similar result is produced by the rollers 120 and 121 on the opposite side of the metal portions 100 and 101.

Figure 5:
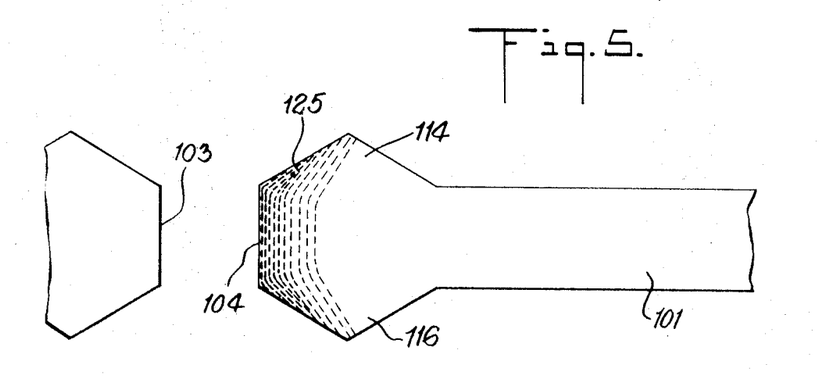
FIG. 5 is an enlarged, end elevation view of the edges shown in the previous FIGS. and illustrates the current distribution therein.

FIG. 5 illustrates by the dotted lines 125 the current distribution at the edge of the metal portion 101, the current distribution at the edge of the metal portion 100 being substantially the same as that shown in FIG. 5. The dotted lines 125 illustrate the current distribution up to the reference depth in the metal of the metal portion 101, the term "reference depth" commonly being used in the art to designate the depth in inches in which approximately 86 percent of the total current flows. Examples of the reference depth in various materials for various frequencies are set forth in the copending application of Wallace C. Rudd, Ser. No. 510,502 filed Nov. 30, 1965, and entitled "Welding by High Frequency Current Penetration."

Although the frequency of the current and the properties of the metal being welded determine the reference depth, the path of the current and the distribution thereof within such reference depth is modified by the so-called proximity effect. Thus, even though the contacts 105 and 106 may not engage the edge surfaces 103 and 104 and may engage the portions 100 and 101 at points spaced away from such surfaces 103 and 104, as shown in FIG. 1, the current will concentrate at the edge surfaces 103 and 104 immediately downstream of the contacts 105 and 106 due to the proximity effect, the current in the portion 100 flowing at any instant in a direction opposite to the direction of current flow in the portion 101. In addition, if the edge surfaces 103 and 104 are not substantially parallel as viewed in cross section, there will be a greater concentration of current in, and therefore, more heating of, the portions of the surfaces 103 and 104 nearer to each other. Accordingly, if uniform heating in the vertical direction across the edge surfaces 103 and 104 is desired, such surfaces are maintained with their surfaces substantially parallel, as viewed in cross section, from the points of application of the current thereto to the weld point.

The proximity of oppositely flowing current in the edge surface 103 also causes the distribution of the current within the reference depth in the portion 101 to be nonuniform and vice versa. Thus, by virtue of the presence of the current flow at the edge surface 103, the current will tend to flow as near as possible to the edge surface 104 and the highest concentration of current will be immediately adjacent the edge surface 104, the higher concentration of the current being indicated by the closely spaced dotted lines 125 and the lower concentration of current being indicated by the more widely spaced dotted lines 125 in FIG. 5.

From the foregoing, it will be apparent that it is possible to adjust the depth of current flow at the edge of the metal portions 100 and 101, and hence, the amount of metal which is heated by the current, by proper selection of the frequency. However, it will also be noted that because of the proximity effect the current intensity is the greatest nearest the surface 104 so that there will be a temperature distribution in the metal, the highest temperature being at the surface 104 and the temperature decreasing inwardly of the surface 104. However, during the time of movement of the metal portions 100 and 101 from the points at which the current is applied thereto to the weld point, the metal inwardly of the surface 104 will also heat by thermal conduction so that it is not necessary to select a frequency having a penetration depth equal to the depth of metal from the surface 104 which it is desired to heat.

Figure 6:
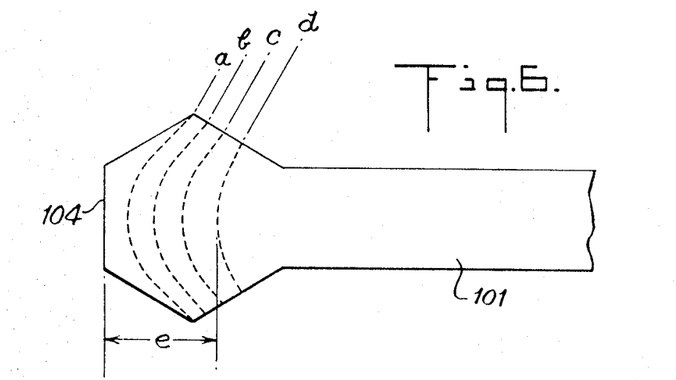
FIG. 6 is an enlarged, end elevation view of one of the edges shown in the previous FIGS. and illustrates the temperature distribution therein.

The dotted lines designated by the letters a, b, c and d in FIG. 6 represent isothermal lines showing the temperature distribution at the edge of the metal portion 101, assuming that the surface 104 is heated to a predetermined temperature as the metal portions 100 and 101 are advanced toward the weld point and assuming that the metal inwardly of the surface 104 is heated solely by thermal conduction in the metal. If it is assumed that the metal portion 101 is made of 1020 steel, three-eighths of an inch thick, and that the surface 104 is heated to 2800° F. by the time it reaches the weld point, the temperatures at the isothermal lines will be substantially as set forth below under the conditions set forth below due to thermal conduction in the metal:

TABLE I

| Speed of advance, ft./min. | Spacing of contacts— inches from weld point | Temperature, ° F. | | | | Depth e in inches |
|---|---|---|---|---|---|---|
| | | a | b | c | d | |
| 10 | 6.0 | 2,000 | 1,500 | 1,000 | 500 | .270 |
| 20 | 5.5 | 2,000 | 1,500 | 1,000 | 500 | .180 |
| 30 | 5.0 | 2,000 | 1,500 | 1,000 | 500 | .141 |
| 40 | 4.5 | 2,000 | 1,500 | 1,000 | 500 | .105 |
| 50 | 4.0 | 2,000 | 1,500 | 1,000 | 500 | .093 |

It is apparent from the foregoing Table I that the temperature of the metal can be raised to at least 500° F. to a substantial depth in relation to the surface 104 with a very small current penetration depth by selecting the spacing of the contacts 105 and 106 from the weld point and the speed at which the metal portions 100 and 101 are advanced. Furthermore, it is desirable to select a current frequency and contact spacing which will permit heating of the metal to the desired depth without overheating, e.g., heating above forging temperature, of the surfaces 103 and 104 with practical welding speeds. Since the electric power required to produce the weld is less if the penetration depth is reduced, it is preferred to use current frequencies in the range from 400,000 Hz. to 500,000 Hz. but, of course, lower or higher frequencies may be employed, such as frequencies in the range from 10,000 Hz. to 1,000 kHz.

As pointed out above, the spacing of the contacts 105 and 106 from the weld point and the speed at which the metal portions 100 and 101 are advanced, and hence, the time during which the edge portions of the metal portions 100 and 101 are subjected to heating current, and the magnitude and frequency of the heating current should be selected so as to heat the edge surfaces 103 and 104 to a welding temperature which will permit the rollers 107, 108, 120 and 121 to move the edge surfaces 103 and 104 and the heated protruding metal as described above at the weld point and form a weld between the metal portions 100 and 101. Preferably, the temperatures and the pressures applied by the rollers 107, 108, 120 and 121 are such that a forge weld is produced between the metal portions 100 and 101.

For satisfactory welding conditions and speeds of advance, the contacts 105 and 106 cannot be widely spaced from the weld point and for this reason the size of the rollers 107, 108, 120 and 121 is limited to approximately 6—10 inches in diameter. As a practical matter, with rollers of such size, the force which can be applied thereby is limited and normally will not substantially exceed about 30—35,000 pounds per roller which is of the order of the force required to produce a forge weld between the metal portions 100 and 101. Therefore, the forces which can reasonably be applied by the rollers is not substantially in excess of forge welding pressure.

As is well known in the art, the forge welding temperature and extrusion temperature for metals varies with the nature of the metal. For example, the forge welding temperature of carbon steel is generally in the range of 2100° F. to 2500° F. 75 whereas the temperature at which it can be readily extruded is in the neighborhood of 2200° F. However, it can be formed or moved as required in connection with the methods of the invention without cracking or other defects with forge welding pressures when the temperature is in the order of 500° F. to 600° F. At temperatures above the forge welding temperature, oxides and scale form which are harmful both to the welding conditions and to the rollers 107, 108, 120 and 121, and the metal is so plastic so as to make it difficult to form a satisfactory forge weld. In addition, during the forming of the edges of the metal portions 100 and 101 to provide bulging formations at the edges thereof, such forming usually being performed at temperatures which are low (e.g., room temperature) compared to the forge welding temperature, the bulging formation becomes work hardened so that if it is not heated to a relatively high temperature during the passage thereof from the contacts to the weld point, the pressure required to squeeze metal thereof into the space 117 can be excessive; i.e., in excess of that which can be applied by the rollers 107, 108 120 and 121. Accordingly, in order to attain the desired conditions, the volume of metal which it is desired to move or displace at the weld point should be heated to a temperature of several hundred degrees, depending upon the type of metal being welded, and for example, carbon steel should be heated to a temperature in the range from approximately 500° F. to 600° F. On the other hand, the temperature at the surfaces 103 and 104 preferably does not exceed that which is required to produce a forge weld therebetween. As a general rule, for ferrous metals, the lowest temperature of the metal to be displaced will be at least one-fourth of the temperature of the edge surface.

In experiments which we have carried out with steel strip, it has been found that satisfactory welds can be produced with the methods of the invention using a current frequency of approximately 450 kHz. and the conditions set forth in the following table:

TABLE II

| Steel thickness, inches | Edge upset height, inches | Edge surface spacing, inches | Spacing of Contacts from pressure rolls, inches | Electric power, kilowatts | Speed of advance, feet/min. |
|---|---|---|---|---|---|
| 0.137 | 0.30 | 0.060 | 3.25 | 53 | 15.4 |
| 0.165 | 0.33 | 0.080 | 3.25 | 55 | 12.5 |
| 0.200 | 0.41 | 0.040 | 3.25 | 50 | 7.0 |

The strip, before upsetting at the edges, was approximately 18 inches wide, and it will be noted that the height of the upset was approximately twice the thickness of the strip.

The methods of the invention are particularly useful in the longitudinal seam welding of large diameter, thick-walled pipe such as, for example, pipe having a diameter of approximately 30 inches and a wall thickness of approximately one-half inch. In the past, such pipes have been manufactured at a rate of about 30 inches per minute by arc welding using a consumable electrode. It has been difficult to weld such pipe using electric resistance welding because the size and stiffness of the metal used has prevented the required bending of the metal in advance of the weld point. However, with the methods of the invention, the prior art forming apparatus may be employed with slight modifications and a pipe with a forge welded seam may be produced at rates up to 25 feet per minute and higher.

Figure 8:
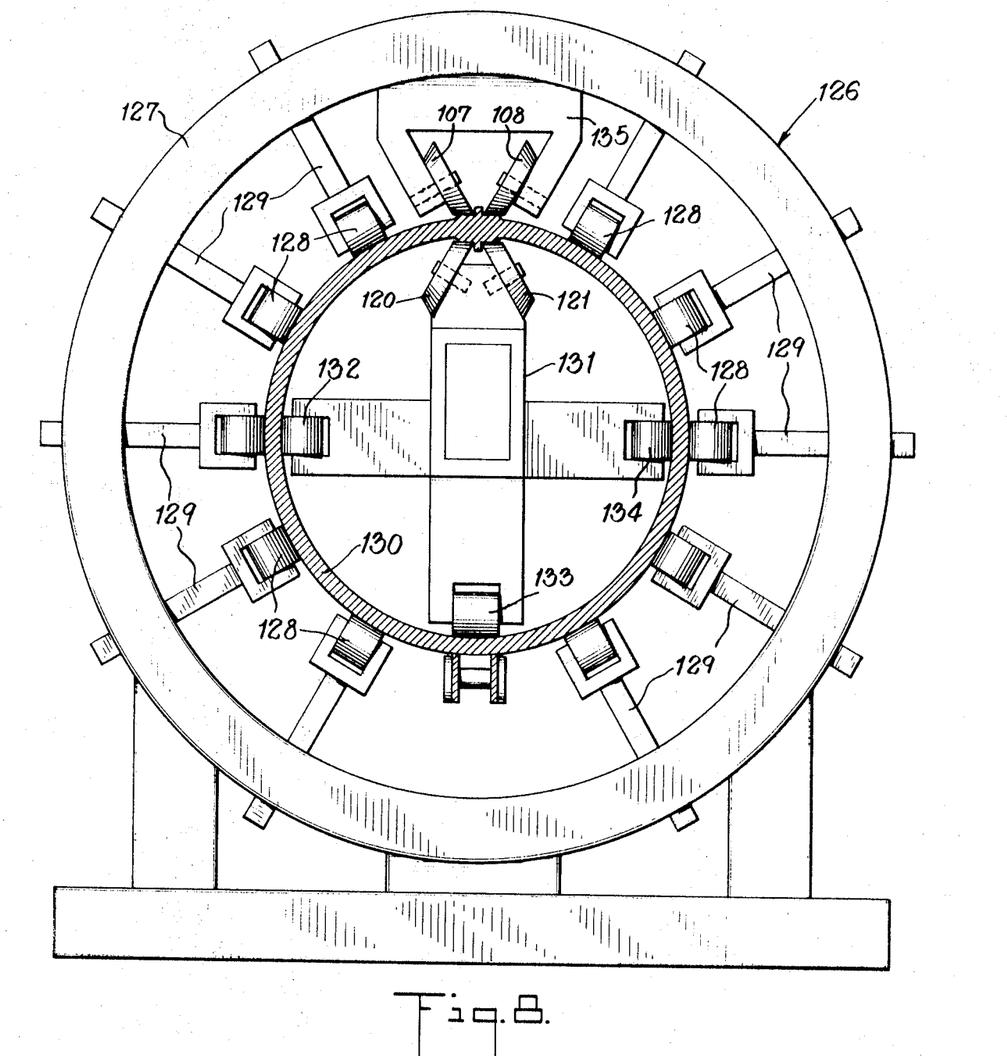
FIG. 8 is an end elevation view partly in cross section illustrating the application of the invention to the manufacture of large diameter, thick-walled tubing or pipe having a welding seam.

FIG. 8 illustrates diagrammatically the use of the methods and apparatus of the invention with a conventional pipe former designated generally by the reference numeral 126 and known in the art as a Berkeley cage, such apparatus being manufactured and sold by the Berkeley-Davis Company, Danville, Ill. The cage comprises a series of rings 127 having mounted thereon a plurality of rollers 128 carried by adjustable shafts 129. A plate of metal such as steel is partially formed into a tube or pipe 130 and is advanced into engagement with the roller 128 which maintain the plate 130 in substantially tubular form with the edges of the plate slightly spaced apart in advance of a weld point at which, with prior art practices, added weld metal was introduced between the edges to form a weld seam therebetween. In accordance with the methods of the present invention, the edges of the plate 130 are maintained substantially parallel and are advanced through the cage 126 with the edges closely spaced in substantially the same manner as they are advanced using the prior art welding processes. However, the prior art welding equipment and method are replaced by equipment of the type illustrated in FIGS. 1—3 and by the method of the invention which permits the edges to be readily welded together using electric resistance heating and forge welding.

As shown in FIG. 8, the rollers 120 and 121 are mounted on a mandrel 131 which is partially supported by rollers 132—134 riding on thinner wall of the tubular pipe 130. The rollers 107 and 108 are mounted on a bracket 135 supported from the ring 127 and contacts similar to contacts 105 and 106 shown in FIG. 1 are mounted in advance of the rollers 107 and 108 in any desired manner so as to supply high frequency heat current to the edges in advance of the rollers 107 and 108. The pipe 130 is advanced by the apparatus normally associated with the Berkeley cage in a direction away from the viewer as the embodiment is viewed in FIG. 8. The considerations to be taken into account in performing such welding and the method of producing the weld are the same as those described above in connection with FIGS. 1 through 7.

The invention is applicable not only to continuous welding of long sheets of strip or metal but also to the welding of such strips or sheets in finite lengths. For the purpose of producing welds to the end of such finite length strips or sheets, narrow tabs having the bulging formation of the edges to be welded together may be temporarily welded to the ends of the strips or sheets at the edges to be joined and later removed. Such tabs are similar to those, and may be used in the manner, described in U.S. Pat. No. 3,209,116.

Figures 9, 10:
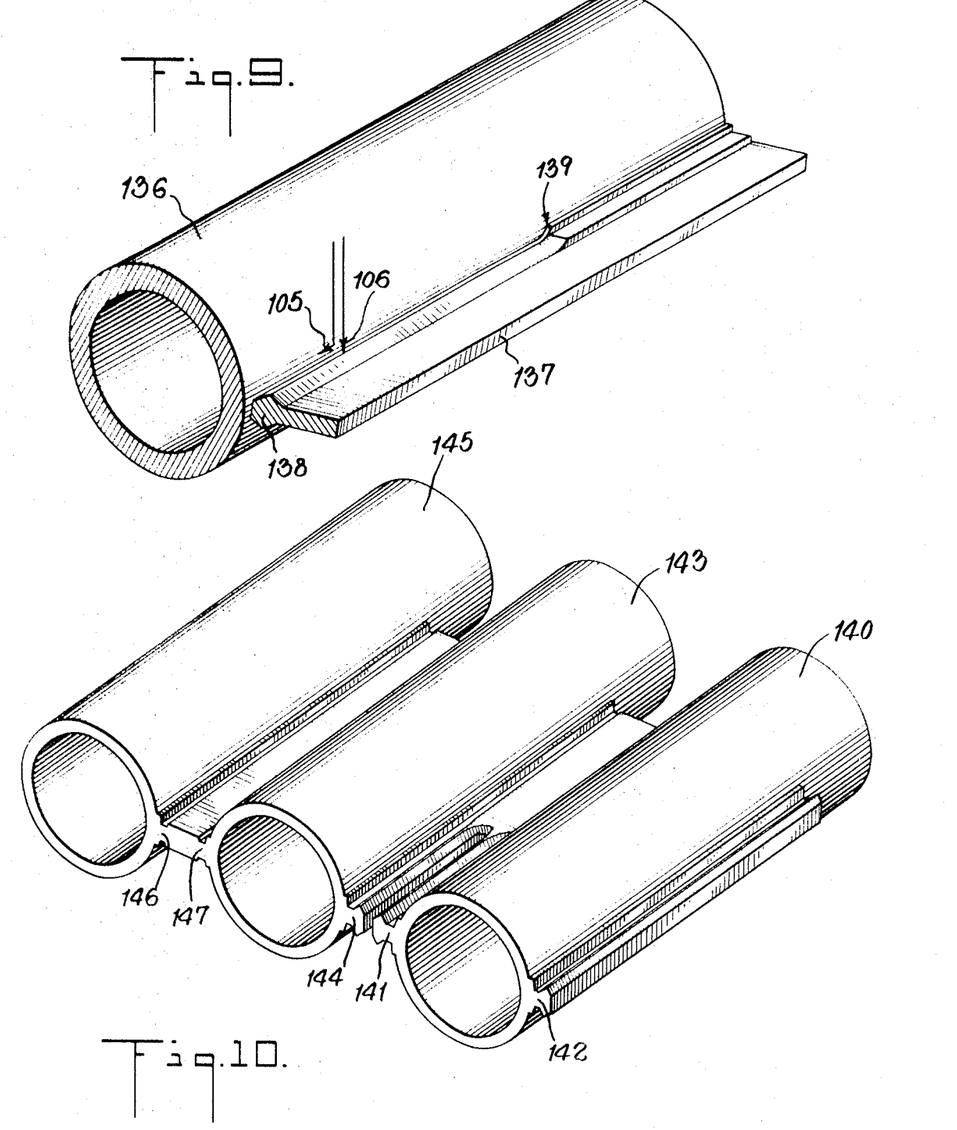
FIG. 9 is a perspective view illustrating the application of the invention to the welding of a fin or joining member to a tube.
FIG. 10 is a perspective view illustrating the application of the invention to the welding together of tubing, such as boiler tubing.

The methods of the invention are also especially useful in the welding of a fin or joining member to a tube in the manner illustrated in FIG. 9. In FIG. 9, tube 136 which may, for example, be a boiler tube, may be welded to a fin or joining member 137 which has its edge 138 to be joined to the tube 136 formed as illustrated in FIG. 9. The fin 137 may be welded to the tube 136 in the manner described above in connection with FIGS. 1—7 bearing in mind that the rollers 107 and 120 would be omitted as unnecessary. However, the protruding metal of the edge 138 and the edge surfaces thereof will be heated in advance of the weld point, indicated generally by the reference numeral 139, by means of high frequency current supplied thereto by way of contacts 105 and 106. At the weld point 139 the protruding metal will be pressed by rollers 108 and 121, not shown in FIG. 9 for ease of illustration, to force the edge surface at the edge 138 against the adjacent heated surface on the tube 136 and produce a weld between the fin 137 and the tube 136 in the manner described above. It will be noted that due to the size and shape of the tube 136 and the fin 137, it would be very difficult to bend them so as to provide a V-gap in advance of the weld point and, therefore, the method of the invention simplifies and makes practical the welding of such a fin to such a tube.

The methods and apparatus of the invention may also be used to join together a series of tubes in the manner illustrated in FIG. 10. In FIG. 10, the tube 140 has welded thereto on opposite sides thereof a pair of joining member 141 and 142 which may be welded thereto using the methods of the invention. Each joining member 141 and 142 has a bulging formation at the free edge thereof and the joining members of adjacent tubes may be welded together using the methods of the invention. Thus, FIG. 10 illustrates a tube 143 which has its joining member 144 partially welded to the joining member 141 using the methods of the invention. A tube 145 is shown connected to the tube 143 by a pair of joining members 146 and 147 which have been welded together using the methods of the invention.

Figures 11, 12, 13, 14:
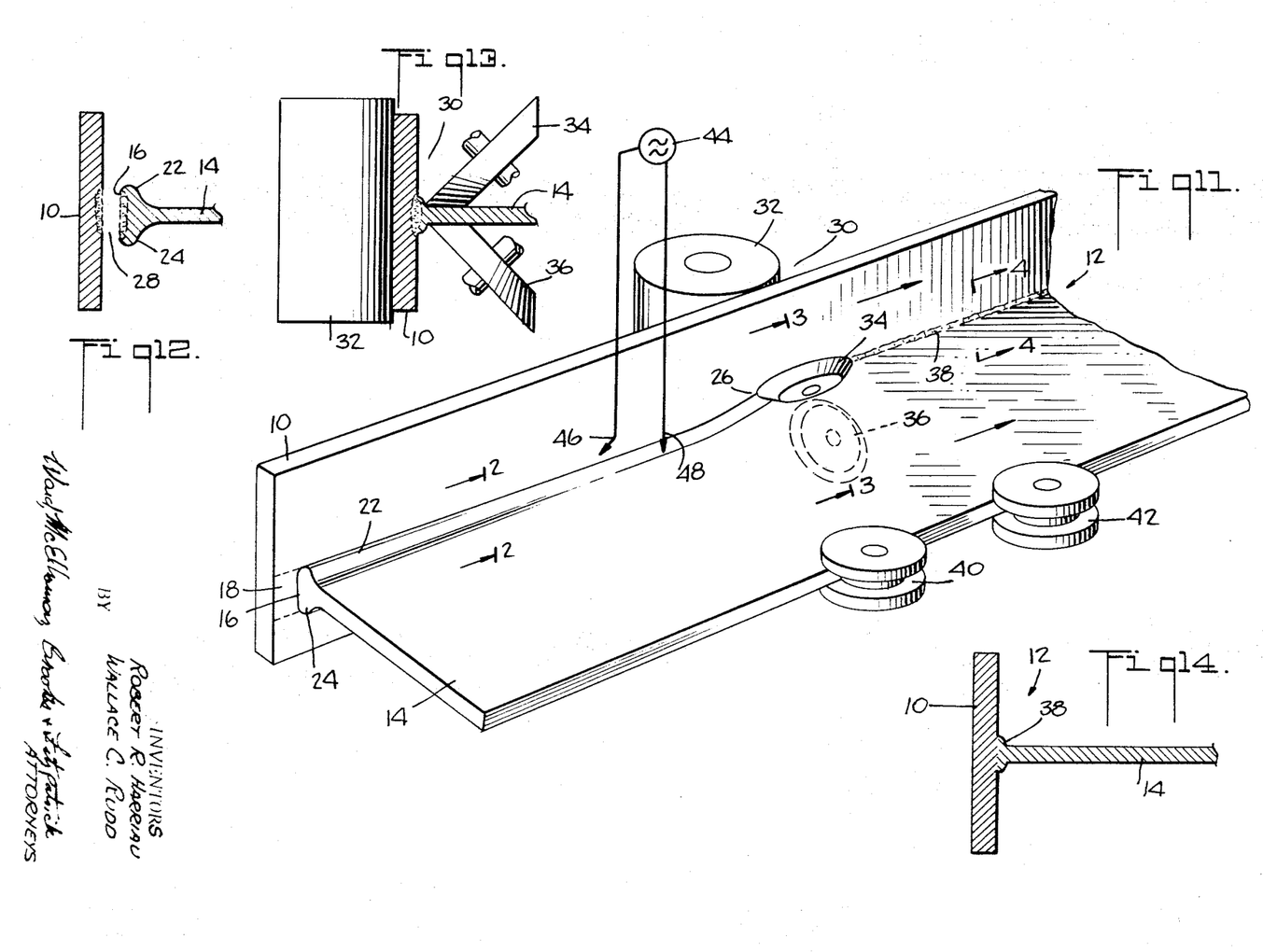
FIG. 11 is a schematic, perspective view of an embodiment of the invention for welding an edge of a weblike member on a flange to form a T member.
FIG. 12 is a vertical sectional view taken along lines 2-2 of FIG. 11 and indicating the positional relationship of the flange and the web as well as the heating pattern on each ahead of the weld point.
FIG. 13 is a vertical sectional view taken substantially along lines 3-3 of FIG. 11 and indicating the weld region just as a weld is being made.
FIG. 14 is a similar vertical sectional view taken substantially along lines 4-4 of FIG. 11 and indicating the resultant weld between the flange and the web.

FIGS. 11—21 illustrate the application of the invention to the manufacture of structural members. FIG. 11 shows a workpiece or strip 10 which may form, for example, a flange of a structural T member 12 and another workpiece or strip 14, which forms a web of the structural member 12 when welded on the edge 16 along a bandlike weld zone 18 on the flange 10.

As best indicated in FIG. 12, the opposite longitudinally extending corners of the edge 16 are preformed in any suitable manner, such as by the use of pressure rollers, so as to have bulging cross sections or beaded edges, the metal of which is at least sufficient in volume to fill the gap 28, after they are heated, without necking down or reduction in thickness at the weld as compared to the thickness of the web strip 14. Preferably, as indicated, the cross sections are such that bulge formations 22 and 24 protrude from both faces or major surfaces of the web 14, although in some cases only one formation, 22 or 24, may be sufficient. One method of preforming the web 14 to have bulging cross sections is described in U.S. Pat. No. 3,410,982. Instead of the cross-sectional shape shown, the edge 16 may have the shape illustrated in FIGS. 1 and 2.

Suitable mechanical means (not shown) are provided to uniformly longitudinally advance both the flange 10 and the web 14 to a weld point, shown generally at 26, and in the directions shown by the arrows in FIG. 11. As best shown in FIG. 12, both the flange 10 and the web 14 are advanced toward the weld point 26 along paths which are substantially parallel to one another but which are spaced apart by the narrow gap 28.

As indicated in FIGS. 11 and 13, the flange 10 and the web 14 pass through a space 30 defined by the peripheries of three rollers 32, 34 and 36. As best shown in FIG. 13, the roller 32 is arranged with its rotation axis parallel to the outer face of the flange 10 and transverse to the path of movement of the flange 10 so as to provide backing support for the outer face of the flange 10 as it passes through the space 30. The rollers 34 and 36, on the other hand, are positioned to roll against and apply substantial pressure to the outboard side surface areas of the bulge formations 22 and 24 of the web 14. More specifically, as illustrated in FIG. 13, the rollers 34 and 36 are preferably arranged to diagonally press the bulge formations 22 and 24 so as to extrude them outwardly of the web 14 and against the flange surface and thereby close the gap 28 between the flange 10 and the web 14 and form a weld 38 as illustrated in FIG. 14.

Since the direction and magnitude of pressure applied by the squeeze rollers 34 and 36 are alone sufficient to provide any necessary forge welding pressure, there is no tendency to buckle the web 14 because there is no significant stress across the web as the forge welding pressure occurs only on the bulge formations 22 and 24 of the flange 10. In addition, with sufficient volume of metal in the formations 22 and 24, the application of forge welding pressure at the formations 22 and 24 has the added advantage of providing a relatively wide weld area between the flange 10 and the web 14 since the edge of the web 14 engages a relatively large area on the flange 10.

Of course, various other rollers as required may be used to condition and control the advancement of the flange 10 and the web 14, including, for example, rollers as at 40 and 42, which guide and control the advance of the structural T member 12 both at and downstream of the weld point 26, respectively.

During the advancement of the flange 10 and the web 14, current from a high frequency source 44 is applied by a flange contact 46 and a web contact 48 to the opposite sides of the gap in advance of the weld point 26, and preferably at different distances in advance of the weld point 26, so that current flows from these contacts along the approaching surfaces at opposite sides of the gap 28 and to and from the weld point 26. The tip of the flange contact 46 preferably touches the flange 10 as nearly in line with the path of heating that is required as possible, i.e., as close as possible to the weld zone 18, and the web contact 48 preferably touches the web 14 at some point closer to the weld point 26 than the flange contact 46, so that both the edge of web 14 and the weld zone 18 of the flange 10 will be raised to nearly the same temperature at the moment corresponding portions of both are joined at the weld point 26.

The magnitude of the heating current and the time during which such heating current flows in the edge of the web 14 should be selected in the manner previously described and so that, in addition to bringing the edge of the web 14 and the metal of the weld zone 18 to forge welding temperature at the weld point, the bulge formations 22 and 24 will also be heated to a temperature such that with the forging pressures attainable with the rollers 34 and 36 the metal of the bulge formations may be squeezed into the gap 28.

Figures 15, 16:
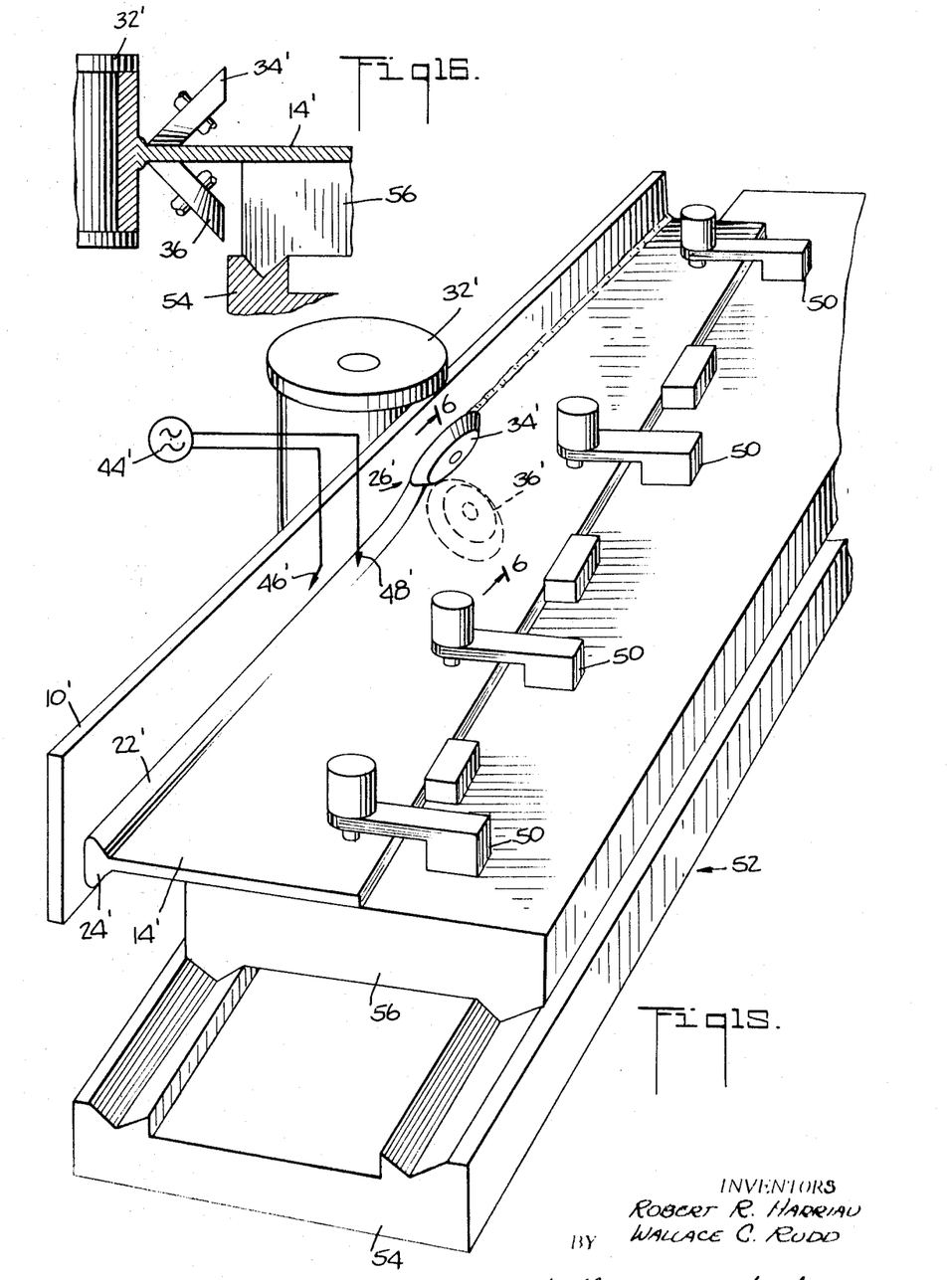
FIG. 15 is a perspective, and somewhat diagrammatic, view illustrating another application of the invention and showing the advancement of the web and flange to the weld point by the use of a planer bed.
FIG. 16 is a vertical sectional view taken substantially along lines 6-6 of FIG. 15 and indicating the weld region just as a weld is being made.

The broad aspects of the present invention are equally applicable for welding metal portions of a variety of shapes, thicknesses and sizes including, for example, a tapered web 14' illustrated in FIG. 15. As illustratively shown, the tapered web 14' may be welded on edge to a flange 10' by securing the tapered web 14' by a well-known pin structure 50 to a movable planer bed 52. The planer bed 52 may take on a variety of constructions, such as having a fixedly mounted bed 54 and a movable slide 56 to which the web 14' is secured. The planer bed 52 is preferably arranged to allow placement of squeeze rollers 34' and 36' as shown in FIGS. 15 and 16 while allowing relative movement of the web 14' past a weld point 26'. In all other essential respects, the embodiment illustrated in FIGS. 15 and 16 is the same as that described in connection with the embodiment shown in FIGS. 11—14. Thus, for example, high frequency heating current is applied as by the contacts 46' and 48' to opposed surfaces of the flange 10' and the web 14' so that the edge of web 14' and the weld zone on flange 10' are appropriately raised to welding temperature as opposed portions thereof reach the weld point 26'; and forge welding pressure is applied by the squeeze rollers 34' and 36' to form a forge weld between the members.

In many instances, however, there may be difficulty in positioning the flange and web contacts in their desired locations on the flange and web, respectively; and in other cases, such as when the weld zone of the flange has essentially higher heat dissipation than the edge to be welded on the flange, there may be difficulty in getting and centering heat in the flange. In these cases, the embodiments illustrated in FIGS. 17—19 have been found most satisfactory.

Figures 17, 18:
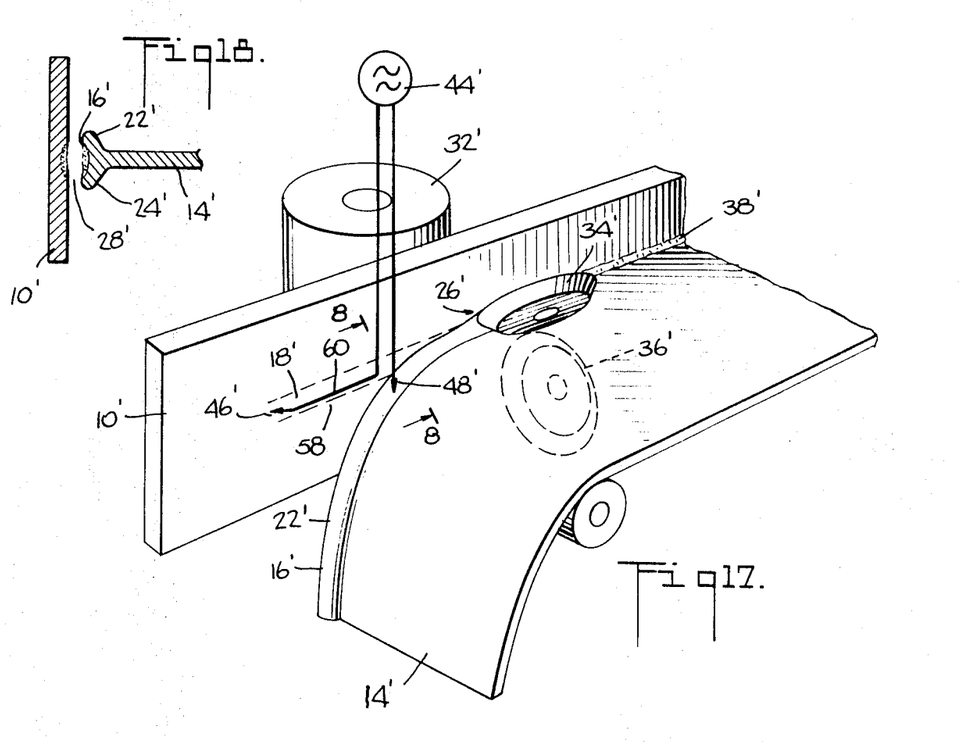
FIG. 17 is a perspective and somewhat diagrammatic view illustrating another form of the invention wherein the web is laterally displaced relative to the flange to provide space for positioning a proximity conductor along the weld zone of the flange.
FIG. 18 is a vertical sectional view taken substantially along the lines 8-8 of FIG. 17 and indicating the positional relationship between the flange and the web and the heating pattern on each before reaching the weld point.

As shown in FIG. 17, a preformed edge 16' of the web 14' may be initially advanced along a path which is bent away from and transverse of the weld zone 18' in the flange 10' to provide a space 58, allowing adequate room for the flange contact 46' and the web contact 48' as well as a proximity conductor 60.

To this end, the web 14' is advanced upwardly and transversely to the weld zone 18' of the flange 10' by power driven rollers (not shown) so that the web 14' is bent around a guide roller 62, while its edge 16' and the bulge formations 22' and 24' thereof remain at all times in planes substantially parallel to the opposing face of the flange 10' as both members approach the point in advance of the weld point 26' where the formations 22' and 24' are pressed toward the flange 10'. The flange 10' and the web 14' may be longitudinally advanced along the parallel paths by suitable advancing mechanism (not shown) so that they are spaced apart in advance of the weld point 26' by a narrow gap 28' (FIG. 18). Shortly in advance of the weld point, squeeze rollers 34' and 36' close the gap 28' by extruding the bulge formations 22' and 24' of the web 14' into the gap 28'. Simultaneously, current from a high frequency source 44' is applied by the flange contact 46' and the web contact 48' to the flange 10' and the web 14' at points in advance of and differently spaced from the weld point 26'.

As best shown in FIG. 17, the tip of the flange contact 46' touches the flange 10' directly in line with the path of desired heating on the flange 10', i.e., the weld zone 18'. The web contact 48', on the other hand, touches the web 14' where the web bends about the roller 62 and at a point where the web edge has been brought close to the weld zone 18' and is essentially in line with the line of weld 38' made in the structural member 12'. However, the web contact 48' could be either slightly upstream or downstream of this latter point.

It will be noted, however, that in many cases in heating the flange 10' along the weld zone 18', the metal at both sides of the weld zone 18' will provide, in effect, a heat "sump" which quickly absorbs the heat produced along the weld zone 18' by conduction, whereas in the case of the edge 16' of the web 14', heat which is built up along the edge 16' can only be conducted into an inwardly of the strip. Thus, the weld zone 18' on the flange 10', which is heated by the same current which heats the edge of the web 14', will necessarily require a longer interval of heating before the weld zone is heated up to the required welding temperature. In view of this fact, and in accordance with the teachings of U.S. Pat. No. 2,821,619, the flange contact 46' is positioned to engage the flange 10' at a point some distance further ahead of the weld point 26' than the point where the web contact 48' engages the web relative to the weld point 26'. Preferably, the relative distance between these two points is chosen with respect to the weld point 26' so that the edge 16' of the web 14' and the weld zone 18' of the flange 10' will be raised to nearly the same temperature at the moment both come to contact at the weld point 26'.

Figure 19:
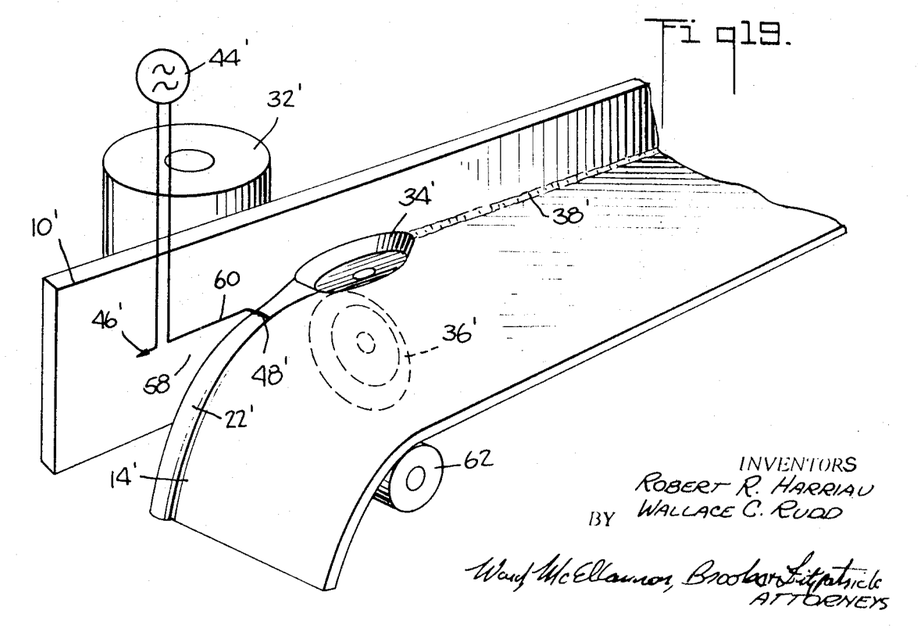
FIG. 19 is a view similar to FIG. 17 but illustrating an alternative method of positioning the proximity conductor along the flange.

The mere location of the contacts 46' and 48' at different distances from the weld point 26' is not entirely satisfactory since, due to the proximity effect of the current-carrying web edge and the fact that such edge with current flowing therein does not extend along the weld zone in the flange 10' in advance of the point where the current is supplied to the web, the current in and heating of the flange is not confined to and concentrated in the weld zone 18' in advance of the point where the current-carrying web edge 16' is brought in close proximity to the weld zone 18'. In accordance with one aspect of the present invention, the heating current is concentrated in the weld zone 18' by positioning the proximity conductor 60 in the space 58 and supplying the heating current to either the flange contact 46' or the web contact 48' through such proximity conductor 60. As shown in FIGS. 17 and 19, the proximity conductor 60 is in close proximity to weld zone 18' of the flange 10' and may be connected in series between the source 44' and either the flange contact 46' (FIG. 17) or the web contact 48' (FIG. 19). In either case, however, the proximity conductor 60 extends from adjacent the flange contact 46' along the portion of the weld zone 18' in advance of the web contact 48' and to near the web contact 48' and functions to control and concentrate the current flowing in the weld zone 18' which is in advance of the web contact 48'. From the web contact 48' to the weld point 26', the current will be concentrated in the weld zOne 18' by the current carrying edge of the web 14'. Accordingly, since substantially all of the current will flow within and along the weld zone 18', the heating will be concentrated in the middle of the weld zone which will heat more rapidly than it will if the proximity conductor 60 were omitted.

Thus, it will be appreciated that by moving the flange 10' and the edge 16' of the web 14' along the described paths, the desired current and hence, heat concentration in the flange 10' is obtained and it is unnecessary to bend either the flange 10' or the web 14' parallel to a major surface thereof. Also, the required gap is provided as well as the space 58 for the insertion of the proximity conductor 60 which functions to concentrate the heating current within the weld zone 18'. Accordingly, since the surfaces of the flange 10' and the web 14' to be welded together may be brought up to substantially the same temperature at the weld point, serious local hardening will not result in the weld between the members and a good uniform weld will be provided. Also, because of better flange heating, a weld can be produced between the flange 10' and the web 14' which is wider than heretofore accomplished, and accordingly the weld between the members will provide a resultant structural T member 12 with excellent fatigue resistance properties at the weld.

Figure 20:
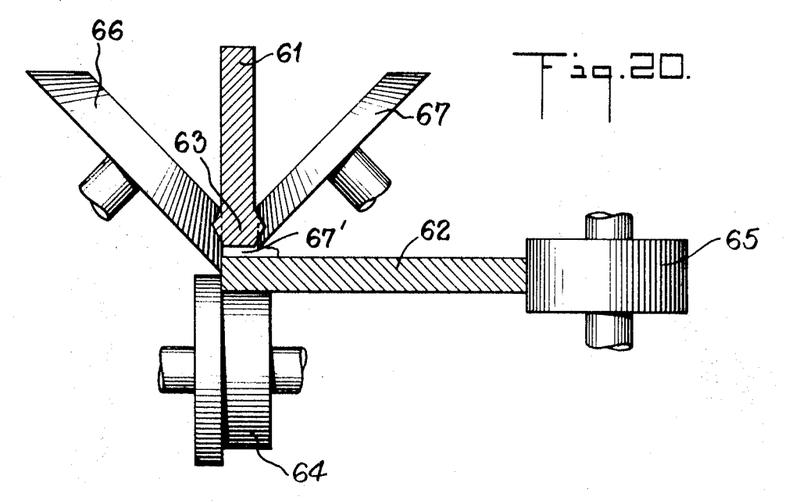
FIG. 20 is an end elevation view, partly in cross section, illustrating the application of the invention to the welding of a first member on edge to another member adjacent an edge thereof to form an L-shaped welded member.

The methods employed as described in connection with FIGS. 11—19 for the manufacture of structural T members may also be employed for the manufacture of structural L members. FIG. 20 illustrates the welding of a member 61 at its edge to a surface of a second member 62 near the edge thereof. The edge 63 of the member 61 is formed as illustrated which, it will be noted, has the shape of the formed edges shown in FIGS. 1 and 2, and such formed edge 63 as well as the surface of the member 62 adjacent thereto are heated in advance of the weld point by high frequency current in the manner described above. The members 61 and 62 are advanced away from the viewer, as seen in FIG. 20, by any conventional means (not shown) and the member 62 is supported and guided by a plurality of rollers including a flanged roller 64 and a roller 65. At the weld point, pressure is applied to the protruding metal at the edge 63 by the frustoconical rollers 66 and 67 in the manner described above so as to cause the space or gap 67' between the edge 63 and the surface of the member 62 to be filled by heated metal at the edge 63 and to produce a weld between the edge 63 and the surface of the member 62.

It will be noted from an examination of the earlier FIGS. showing the joining together of the edges of a pair of metal portions that it is preferred to provide bulging formations at both edges and to provide metal protruding from both the upper and lower surfaces of both edges. In this way, each roller is required to move only a relatively small amount of metal at the weld point to fill the gap between the edges at the weld point.

Figure 21:
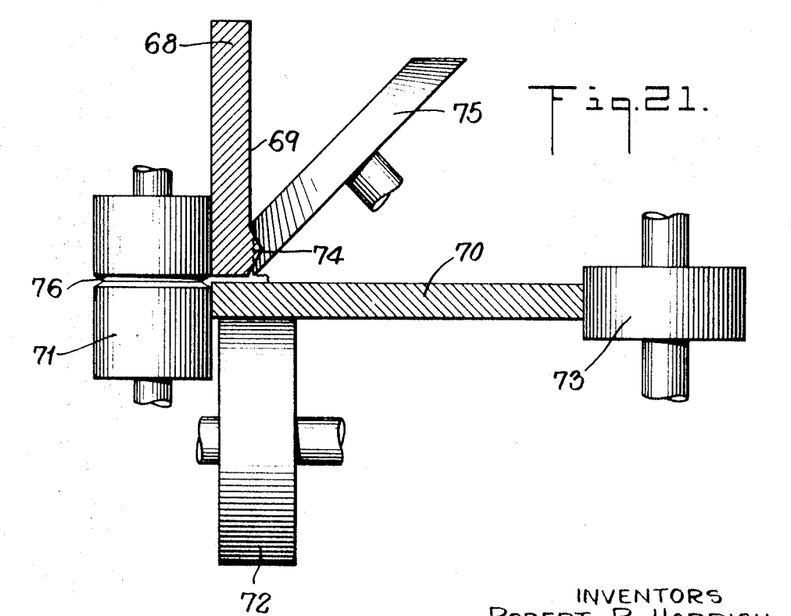
FIG. 21 is an end elevation view partly in cross section and illustrates an alternative embodiment of the invention for welding a member on edge to another member adjacent an edge thereof.

However, it is also possible in such embodiments to provide a bulging formation at only one of the edges and to have metal protruding from both surfaces at such edge or if desired, a bulging formation may be provided at only one edge with metal protruding only from one of the surfaces thereof. FIG. 21 which is similar to FIG. 20 also shows the manufacture of a L member but in the embodiment shown in FIG. 21 only the edge of the member 68 has a bulging formation and metal of the bulging formation protrudes only from the surface 69 thereof. In the embodiment in FIG. 21, both the member 68 and the member 70 are advanced away from the viewer and the members 68 and 70 are guided by a plurality of rollers including the rollers 71 and 62 and 73. At the weld point, the protruding metal 74 at the edge of the member 68 is pressed by the roller 75 so as to fill the gap between the edge of the member 68 and the surface of the member 70 and to form a weld therebetween. The roller 71 is provided with a groove 76 so as to permit the heated metal which is being caused to flow into the gap between the member 68 and the member 70 to extrude for a short distance out of the gap.

As used herein and in the appended claims, the terms "upper," "lower" and "vertical" are only relative terms used for ease in explanation of the invention, and it will be apparent to those skilled in the art that the use of the invention is not limited to cases where the items described thereby are either "upper," "lower" or "vertical."

We claim:

1. Method for welding an edge of a first elongated metal portion to a surface of a second elongated metal portion, at least said first portion having upper and lower surfaces extending in the length and width directions thereof and transversely to the edge thereof and having a bulging cross-sectional shape at its edge which, in cross section, is of increased thickness relative to the thickness of said first portion spaced away from said edge and has a predetermined volume of metal protruding at least above said upper surface and an edge surface extending therefrom toward said lower surface, said method comprising advancing said surface of said second portion and said edge surface, and hence said portions, to immediately in advance of a weld point along spaced paths lying in closely spaced and substantially parallel planes, the spacing between the two last-mentioned surfaces being selected so that the volume of protruding metal is at least substantially equal to the volume of the space immediately in advance of said weld point which is between said last-mentioned surfaces and is intermediate extensions of said upper and lower surfaces; in advance of said weld point, causing high frequency current to flow to and from said weld point on said surface of said second portion, at said edge surface and in the protruding metal with a magnitude and for a time sufficient to heat the two last-mentioned surfaces to welding temperature and at least a portion of the protruding metal to a temperature which permits extrusion thereof under pressure by the time said last-mentioned surfaces and the protruding metal reach said weld point; and in advance of and at said weld point, while still advancing said portions along substantially parallel paths, applying pressure to the heated protruding metal directed to move metal thereof toward said space and to substantially fill said space with metal of said edge, thereby to form a weld between said portions.

2. Method as set forth in claim 1 wherein said edge has metal protruding from both the upper and lower surfaces thereof and the combined volume thereof is at least substantially equal to the volume of said space, and wherein both protruding metal portions are heated and pressure is applied thereto to fill said space.

3. Method as set forth in claim 2 wherein said edge is substantially hexagonal in cross section and said edge surface is a side of the hexagon and wherein pressure is applied to the pairs of sides of the hexagon next adjacent to said edge surface side.

4. Method as set forth in claim 1 wherein said surface of said second metal portion and said edge surface have linear portions, as viewed in cross section, and said linear portions are maintained substantially parallel as said edge surface and said surface of said second metal portion are advanced from the points at which current is supplied thereto to adjacent the weld point.

5. Method as set forth in claim 1 wherein said current is supplied to said portions by contacts engaging said portions in advance of the weld point.

6. Method as set forth in claim 1 wherein said surface of said second metal portion is an edge surface thereof.

7. Method as set forth in claim 1 wherein said surface of said second metal portion is intermediate the edges thereof.

8. Method as set forth in claim 7 wherein said current is supplied to said surface of said second metal portion and said edge surface by contacts respectively engaging said portions in advance of said weld point and wherein said edge surface is advanced in advance of the point of engagement of the contact therewith along a path which extends at an angle to path thereof from said point to the weld point.

9. Method as set forth in claim 8 wherein the contact engaging of said second metal portion is spaced farther from said weld point than the contact engaging said first metal portion and wherein said current is supplied to one of said contacts along a path extending from said one contact to adjacent the other of said contacts and in close proximity to the portion of said surface of said second metal portion which is in advance of said point of engagement of the contact with said first metal portion.

10. Method as set forth in claim 1 wherein said surface of said second metal portion and said edge surface are heated to forge welding temperature and the protruding metal to be moved and metal therebelow are heated to a lower temperature but at least to its hot working temperature.

11. Method as set forth in claim 10 wherein said protruding metal and metal therebelow are heated at least to a temperature of several hundred degrees Fahrenheit.

12. Method as set forth in claim 1 wherein said spacing between said surface of said second metal portion and said edge surface is substantially equal to the spacing required to prevent voltage breakdown therebetween.

13. Method as set forth in claim 1 wherein said second metal portion is a metal tube.

14. Method for welding together the edges of first and second elongated metal portions, said first and second portions each having upper and lower surfaces extending in the length and width directions thereof and transversely to the edge thereof and having a bulging cross-sectional shape at its edge which, in cross section, is of increased thickness relative to the thickness of the portion spaced away from said edge and has a predetermined volume of metal protruding at least above said upper surface and an edge surface extending therefrom toward said lower surface, said method comprising advancing said edge surfaces, and hence said portions, to immediately in advance of a weld point along spaced paths lying in closely spaced and substantially parallel planes, the spacing between said edge surfaces being selected so that the volume of protruding metal is at least substantially equal to the volume of the space immediately in advance of said weld point which is between said edge surfaces and is intermediate extensions of said upper and lower surfaces; in advance of said weld point, causing high frequency current to flow to and from said weld point on said edge surfaces and in the protruding metal with a magnitude and for a time sufficient to heat said edge surfaces to welding temperature and at least a portion of the protruding metal to a temperature which permits extrusion thereof under pressure by the time said edge surfaces and the protruding metal reach said weld point; and in advance of and at said weld point, while still advancing said portions along substantially parallel paths, applying pressure to the heated protruding metal directed to move metal thereof toward said space and to substantially fill said space with metal of said edge at said weld point, thereby to form a weld between said portions.

15. Method as set forth in claim 14 wherein said first and second metal portions are opposite edges of a metal strip and wherein said strip is formed substantially into a tube in advance of the point of application of said current to said edge surfaces and is maintained in the form of such tube as it is advanced.

16. Method as set forth in claim 14 wherein each said edge has metal protruding from both the upper and lower surfaces and the combined volume thereof is at least substantially equal to the volume of said space, and wherein both protruding metal portions are heated and pressure is applied thereto to fill said space.

17. Method as set forth in claim 16 wherein said first and second metal portions are opposite edges of a metal strip and wherein said strip if formed substantially into a tube in advance of the point of application of said current to said edge surfaces and is maintained in the form of such tube as it is advanced.

18. Method as set forth in claim 16 wherein said current is supplied to said portions by contacts engaging said portions by contacts engaging said portions in advance of the weld point.

19. Method as set forth in claim 14 wherein said surface of said second metal portion and said edge surface are heated to forge welding temperature and the protruding metal to be moved and metal therebelow are heated to a lower temperature but at least to its hot working temperature.

20. Method as set forth in claim 14 wherein said spacing between said edge surfaces is substantially equal to the spacing required to prevent voltage breakdown therebetween.

21. Apparatus for welding an edge of a first elongated metal portion to a surface of a second elongated metal portion, at least said first portion having upper and lower surfaces extending in the length and width directions thereof and transversely to the edge thereof and having a bulging cross-sectional shape at its edge which, in cross section, is of increased thickness relative to the thickness of said first portion spaced away from said edge and has a predetermined volume of metal protruding at least above said upper surface and an edge surface extending therefrom toward said lower surface, said apparatus comprising means for advancing said portions along substantially parallel paths both in advance of and after a predetermined weld point and advancing said surface of said second portion and said edge surface to immediately in advance of said weld point along spaced paths lying in closely spaced and substantially parallel planes, the spacing between the two last-mentioned surfaces being selected so that the volume of protruding metal is at least substantially equal to the volume of the space immediately in advance of said weld point which is between said last-mentioned surfaces and is intermediate extensions of said upper and lower surfaces; means including contacts engageable with said portions in advance of said weld point for supplying high frequency current to said portions; and means at said weld point engageable with said protruding metal for applying pressure thereto in advance of and at said weld point and for displacing said protruding metal toward said space and forcing said surface of said second metal portion and said edge surface together to produce a weld between said portions at said weld point.

22. Apparatus as set forth in claim 21 wherein said means for applying pressure comprises a pair of rollers mounted adjacent said upper and lower surfaces respectively at said weld point with their axes extending transversely to the direction of advance of said portions and mounted with their peripheral surfaces spaced apart at the nip thereof by a distance less than said increased thickness.

23. Apparatus as set forth in claim 22 wherein said rollers are of frustoconical shape and are mounted with their axis extending at an angle with respect to said upper and lower surfaces and with their surfaces at the nip thereof extending substantially parallel to said upper and lower surfaces.

24. Apparatus as set forth in claim 21 wherein said edge has metal protruding from both the upper and lower surfaces thereof and the combined volume thereof is at least substantially equal to the volume of said space and wherein said means for applying pressure is engageable with both protruding metal portions.

25. Apparatus as set forth in claim 24 wherein said means for applying pressure comprises a pair of rollers mounted adjacent said upper and lower surfaces respectively at said weld point with their axes extending transversely to the direction of advance of said portions and mounted with their peripheral surfaces spaced apart at the nip thereof by a distance less than said increased thickness.

26. Apparatus as set forth in claim 21 wherein said surface of said second metal portion is an edge surface at the edge thereof which is formed substantially the same as the edge of said first metal portion and wherein said means for applying pressure comprises two pairs of rollers, one pair being mounted adjacent said upper and lower surfaces of said first portion, respectively, and the other pair being mounted adjacent the upper and lower surfaces of said second portion, respectively, said two pairs of rollers being mounted at the weld point with their axes extending transversely to the direction of advance of said portions and being mounted with their peripheral surfaces spaced apart at the nip thereof by a distance less than the increased thicknesses of the adjacent edges.

27. Apparatus as set forth in claim 26 wherein the surfaces of one of said pair of rollers are spaced from the surfaces of the other of said pair of rollers so as to permit the extrusion of metal therebetween.